United States Patent

[11] 3,607,738

[72] Inventor Donald A. Nelson
  Knoxville, Tenn.
[21] Appl. No. 798,783
[22] Filed Feb. 12, 1969
[45] Patented Sept. 21, 1971
[73] Assignee Nalco Chemical Company
  Chicago, Ill.

[54] SEWAGE TREATMENT
  3 Claims, No Drawings
[52] U.S. Cl. ....................................................... 210/18,
  23/109, 210/45, 210/51
[51] Int. Cl. ....................................................... C02b 1/18
[50] Field of Search .......................................... 210/18,
  51–54, 60, 45, 47; 23/105, 109

[56] References Cited
  UNITED STATES PATENTS

| | | | |
|---|---|---|---|
| 3,372,129 | 3/1968 | Phillips | 210/54 X |
| 3,423,309 | 1/1969 | Albertson | 210/53 X |
| 3,440,165 | 4/1969 | Davis et al. | 210/53 X |
| 3,488,717 | 1/1970 | Wukasch et al. | 210/53 |
| 2,347,576 | 4/1944 | Ogilby | 210/54 X |
| 3,219,578 | 11/1965 | Cruickshank et al. | 210/52 |
| FOREIGN PATENTS | | | |
| 637,703 | 3/1962 | Canada | 210/52 |
| 826,770 | 1/1960 | Great Britain | 210/52 |

Primary Examiner—Michael Rogers
Attorneys—Johnston, Root, O'Keeffe, Keil, Thompson & Shurtleff, John G. Premo, Charles W. Connors and Morando Berrettini ABSTRACT: Sewage treatment in which sewage is passed to a tertiary treatment plant from an activated sludge plant, said tertiary treatment including the step of intimately mixing lime and particular polyamines with the effluent from the secondary clarifier. The polyamines catalyze the reduction of phosphate in the sewage by the lime, thereby lowering the quantity of lime required to produce water having a satisfactory phosphate level.

SEWAGE TREATMENT

DESCRIPTION OF THE INVENTION

This invention relates to the treatment of waste waters and more particularly to the treatment of waste waters that have been passed through primary and secondary treatment zones. The invention involves the addition of particular polyamines and lime to the waste waters which have passed through a secondary clarifier.

In many areas it is important that sewage or waste water be treated so as to remove inorganic nutrients such as nitrogen and phosphorus. Sewage that is passed through a primary and secondary clarifier often contains sufficient phosphates and nitrogen to cause the formation of algae of plankton in bodies of water to which such treated waste waters are passed. In order to eliminate phosphates and nitrogen it is known to give waste water a tertiary treatment following passage of the waste water through a primary clarifier and a conventional activated sludge plant. Lime has been added to a secondary effluent for this purpose. When lime is added to the waste water it reacts with the phosphates that are in the sewage to form insoluble tricalcium phosphate. The feasibility of using lime as a sewage coagulent to remove phosphates is determined (1) by the amount of lime required to lower the phosphate content to a satisfactory level, and (2) the cost of recovering the lime for reuse in the plant.

It would be desirable to reduce the amount of lime required to remove phosphates in the tertiary treatment plant. An object of the present invention, therefore, is to provide a new process for removing phosphates from waste waters wherein the quantity of lime required for this purpose is markedly reduced.

Other objects will become apparent to those skilled in the art from the following detailed description of the invention.

It has been found that phosphates can be removed from waste waters in an economical manner by mixing both lime and particular polyamines with the sewage in the tertiary clarifier. The polyamines apparently act as a catalyst producing more efficient lime reaction with phosphates. Improved coagulation of tricalcium phosphate is obtained at lower lime levels. It was found in fact that a straight line relationship exists between the amount of the subject polyamine added to the system and the amount of phosphate removed. As an example, it has been found that as much as 150 p.p.m. of calcium hydroxide can be replaced with 5 p.p.m. of the polyamine while still producing a treated water having the same phosphate level.

The polyamine which is used in the process is defined as the reaction product of an alkylene dihalide and an amine. The amine reactant has the following structural formula:

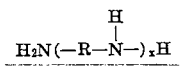

where R is an alkylene radical selected from the group consisting of

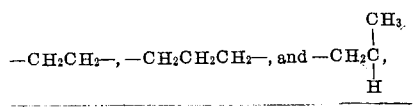

and $x$ is an integer of 0–5. R, when present, is preferably an ethylene radical. Preferred reactants are ammonia, ethylene diamine, diethylene triamine, tetraethylene pentamine and triethylene tetramine. Of these, the most preferable due to its excellent reactivity, low cost and availability is ammonia.

The alkylene dihalide reactant may be chosen from a wide variety of difunctional organics. Preferred among these are ethylene dichloride, 1,3-propylene dichloride and 1,2-propylene dichloride. Of these the most preferred is ethylene dichloride.

The reaction itself should be carried out under carefully controlled conditions. The temperature of reaction ranges from about 75° to about 200° C. The polymerization is effected under a pressure of 75–1,000 p.s.i. The reaction itself is accomplished by slowly introducing an amine into a reaction zone at a rate sufficient to maintain a fixed predetermined pressure within the above limits. Simultaneously, an alkylene dihalide is introduced into the reaction zone at a rate sufficient to maintain a fixed predetermined temperature within the aforementioned limits. Sufficient water should be initially introduced into the reaction zone so that the formed organic product is solubilized therein both at any point during the polymerization and subsequently upon completion of the run.

If such above reaction conditions are followed, polyamine products of relatively high molecular weight are achieved. For example, reaction of ammonia and ethylene dichloride according to the above directions yields mixed polyamines having an average molecular weight in excess of 300 and usually in excess of 500. Polyamine products having a molecular weight even as high as 5,000 may be achieved.

The polymerization reaction is more preferably carried out at temperatures from about 80° C. to 140° C. and under pressures ranging from about 75 p.s.i. to about 200 p.s.i. In such cases, the products have better clarity, and less color than do those formed under more stringent reaction conditions.

The above described reaction is exothermic. Therefore, in order to control the reaction and allow a higher addition rate of alkylene dihalide, it is preferred that a cooling jacket or other source of external cooling be applied to the reaction zone. In any case, whether external cooling is applied or not, the flow of alkylene dihalide is adjusted so as to maintain the temperature substantially at any point chosen from within the above-mentioned range. Likewise, the introduction of amine is controlled by a pressure regulator valve or by any other suitable method whereby the pressure is not allowed to rise or fall to a point substantially different from that particular pressure chosen from within the above stated range.

After the reactor volume has been substantially filled with reaction product, the alkylene dihalide flow is ceased. The residual, unreacted alkylene dihalide is consumed by further reaction with the amine reactant, preferably at the same temperature and pressure as previously employed in the run. Amine introduction is then terminated and excess amine in the reactor vented to the atmosphere or used in a subsequent run. This step of reacting trace amounts of residual unreacted alkylene dihalide is generally accomplished in 5–60 minutes depending upon operating conditions.

If the ammonia has been reacted with an alkylene dihalide, ammonium chloride byproduct is produced. Surprisingly enough, by closely following the above directions, this byproduct is salted out from the aqueous reaction product solution at room temperature. Thus, a simple separation of ammonium chloride from organic is possible by merely subjecting the reaction product to centrifugation techniques or filtration. It is greatly preferred that the ammonium chloride be centrifuged off from the organic polyamine which remains in aqueous solution.

The relatively high molecular weight polyamine product itself, at the termination of the reaction, is generally in a polyamine hydrohalide form. If the free base is desired, neutralization may be effected by addition of some strong base such as calcium hydroxide, sodium hydroxide, potassium hydroxide, etc. Again the salt formed from the neutralization may be easily separated from the organic free base. By the term "polyamine" it is understood then to means both the free base, or amine salt form or mixtures of the two.

As mentioned above, a greatly preferred reaction mixture involves use of ammonia and ethylene dichloride. In one specific embodiment a dilute heel of ammonia is charged to the reactor in an amount just sufficient to allow agitation to be carried on. The heel is heated to a desired pressure and temperature within the aforementioned limits, and then ammonia and ethylene dichloride are metered in at a rate whereby this present temperature and pressure are maintained constant. When reactor volume is completely filled with product, the reaction is terminated and the product withdrawn from the system.

The reaction itself may be carried out over a wide range of times. Of course, such variable is related directly to the the size of the batch prepared as well as temperature and pressure variables. Generally, however, the reaction takes from about one-half to about 20 hours and most often is complete in 1–12 hours time. Also, if one follows the above-outlined procedure with respect to reactant feed rates, it has been determined that approximately 1–4 moles of amine are used up in reaction with 1 mole of alkylene dihalide over the course of the entire run, and more generally 2–3 moles of amine per mole of alkylene dihalide are expended.

The following example illustrates the preparation of a polyamine additive of the present invention.

EXAMPLE

A 20-gallon glassed steel reactor is set up to which is attached external sources of both anhydrous gaseous ammonia and ethylene dichloride. A pressure regulator valve was inserted in the line leading from the ammonia source to the reactor. The reactor was first charged with 35 pounds of water. This was a sufficient volume to allow good agitation with the equipment employed. The reactor was heated until the temperature reached 100° C. and the system then pressurized with the anhydrous ammonia to 100 p.s.i. The system was then vented to remove air, repressurized to 100 p.s.i. with ammonia and heated to 100° C. The above pressure was maintained at this 100-p.s.i. level by gradual introduction of gaseous ammonia throughout the reaction to replace reacted ammonia.

Ethylene dichloride was then pumped into the reactor and water cooling turned on. During the reaction, the temperature of the reaction was maintained at 100° C. by adjusting the amount of ethylene dichloride introduced. By such careful manipulation of rate of ethylene dichloride added to the system, the temperature of the exothermic reaction could be maintained constant at the 100° C. level. It took approximately 2 hours to feed the total amount of ethylene dichloride reactant.

After the reactor had approached its capacity charge, the pumping of ethylene dichloride into the reaction zone was discontinued. The reaction was further heated for one-half hour to react residual ethylene dichloride and then flow of anhydrous ammonia was terminated. The system was then cooled and vented. The polyamine product was then subjected to centrifugation and the ammonium chloride byproduct separated out from the aqueous solution of polymeric amine. After the centrifuging step, the polyamine contained only about 1–2 percent ammonium chloride. Separation therefore of the unwanted salt from aqueous polyamine solution was excellent.

Molecular weight determinations were made on the above polyamine product. The molecular weight was in excess of 300 and the product contained substantially no lower molecular weight polyamine such as ethylene diamine, diethylene triamine and tetraethylene pentamine.

The amount of cationic polyamine used in the process can vary widely. As was pointed out above, as little as 5 p.p.m. of polyamine added to the effluent from the secondary settler made it possible to lower the amount of lime added to 150 p.p.m. and still produce the same effect. It is contemplated that from about 1 to about 40 p.p.m. of polyamine will be used, and most often from about 3 to about 15 p.p.m. The amount of lime added to the effluent from the secondary settler will depend to a large extent on the amount of polyamine used in the process. A combination of 5 p.p.m. of polyamine and 400 p.p.m. of lime has been used with success on effluent from a secondary treatment zone containing as much as 25–30 mg./l. as $PO_4$. The quantity of phosphate in the final effluent has been lowered to 0.2–1 mg./l. as $PO_4$.

The lime and polyamine are intimately mixed with the effluent from the secondary settler at ambient temperatures. The effluent is then passed to a tertiary settler where coagulation and settling occurs. The presence of the polyamine also serves to increase the rate at which the insoluble products settle out.

In order to remove nitrogen, effluent from the tertiary settler can be passed to an ammonia stripping tower. If the pH of the waste water is sufficiently high, agitation of the waste water in the stripping tower will liberate ammonia gas. The amount of gas that is liberated increases as the pH is increased from 7.0 to 11.5.

The lime that is used in the present process can be reclaimed by calcining the lime sludges in a muffle furnace at 1,800° F. for 90 minutes. A certain amount of the lime is lost and must be made up. Phosphate removal is not adversely affected by recycling the reclaimed lime.

I claim:

1. In a process for treating sewage disposal waste water containing phosphate, the improvement which comprises: intimately mixing both lime and a cationic polyamine having a molecular weight of at least 300 with effluent leaving an activated sludge treatment zone, said polyamine being formed by reacting (a) an amine having the formula:

where R is an alkylene radical selected from the group consisting of

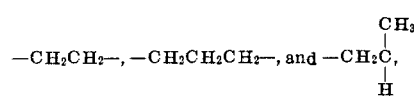

and $x$ is an integer of 0–5, and (b) an alkylene dihalide, and allowing precipitated tricalcium phosphate to settle out of said waste water.

2. A process as claimed in claim 1 wherein said polyamine is the reaction product of ammonia and ethylene dichloride.

3. A process as in claim 1 wherein the amount of polyamine added to said waste water is from 1 to 40 p.p.m. based on the amount of waste water.